US011946388B2

(12) United States Patent
D'Ettole et al.

(10) Patent No.: US 11,946,388 B2
(45) Date of Patent: Apr. 2, 2024

(54) TURBINE ENGINE WITH INTERLOCKING SEAL

(71) Applicant: GE Avio S.r.l., Rivalta di Turin (IT)

(72) Inventors: Antonio Giusseppe D'Ettole, Rivoli (IT); Andrea Depalma, Rivalta di Turin (IT); Roberto Maddaleno, Lanzo Torinese (IT); Matteo Renato Usseglio, Turin (IT)

(73) Assignee: GE Avio S.r.l., Rivalta di Torino (IT)

(*) Notice: Subject to any disclaimer, the term of this patent is extended or adjusted under 35 U.S.C. 154(b) by 0 days.

(21) Appl. No.: 17/863,470

(22) Filed: Jul. 13, 2022

(65) Prior Publication Data

US 2022/0364473 A1 Nov. 17, 2022

Related U.S. Application Data

(63) Continuation of application No. 16/936,567, filed on Jul. 23, 2020, now abandoned.

(30) Foreign Application Priority Data

Aug. 2, 2019 (IT) ........................ 102019000013854

(51) Int. Cl.
*F01D 5/22* (2006.01)
*F01D 11/12* (2006.01)

(52) U.S. Cl.
CPC ............ *F01D 5/225* (2013.01); *F01D 11/125* (2013.01); *F05D 2220/32* (2013.01); *F05D 2240/30* (2013.01); *F05D 2240/55* (2013.01)

(58) Field of Classification Search
CPC ..... F01D 1/16; F01D 1/24; F01D 1/26; F01D 5/22; F01D 5/225; F01D 9/041;
(Continued)

(56) References Cited

U.S. PATENT DOCUMENTS 3,752,599 A * 8/1973 Pace ....................... F01D 5/225 416/190
4,767,273 A * 8/1988 Partington ................ F01D 5/22 416/190

(Continued)

FOREIGN PATENT DOCUMENTS

CN 107762570 A 3/2018
CN 109519224 A 3/2019

(Continued)

OTHER PUBLICATIONS

BS Stainless, "Nickel and it's Link to Stainless Steel", Aug. 11, 2011, https://www.bsstainless.com/nickel-and-its-link-to-stainless-steel (Year: 2011).*

*Primary Examiner* — Courtney D Heinle
*Assistant Examiner* — Danielle M. Christensen
(74) *Attorney, Agent, or Firm* — McGarry Bair PC

(57) ABSTRACT

A turbine engine with an outer rotor that circumscribes an inner rotor. The outer rotor includes circumferentially arranged components with a radial outer end and radial inner end. Inner ends of confronting sides of adjacent components include at least one damper element to dampen the relative motion of the components or to provide at least a partial seal between adjacent components.

20 Claims, 10 Drawing Sheets

(58) Field of Classification Search
CPC .... F01D 11/001; F01D 11/005; F01D 11/006; F01D 11/008; F01D 11/125; F05D 2240/30; F05D 2240/55; F05D 2260/96
See application file for complete search history.

(56) References Cited

U.S. PATENT DOCUMENTS

| | | | | |
|---|---|---|---|---|
| 4,776,764 | A * | 10/1988 | Ortolano | F04D 29/322 416/190 |
| 5,154,577 | A | 10/1992 | Kellock et al. | |
| 5,224,822 | A | 7/1993 | Lenahan | |
| 5,709,530 | A | 1/1998 | Cahill et al. | |
| 6,984,108 | B2 * | 1/2006 | Anderson | F01D 5/22 415/209.1 |
| 7,186,073 | B2 | 3/2007 | Orlando | |
| 7,261,514 | B2 | 8/2007 | London et al. | |
| 8,240,985 | B2 | 8/2012 | Martin | |
| 8,500,392 | B2 | 8/2013 | Durocher et al. | |
| 8,684,692 | B2 * | 4/2014 | Mayer | F01D 5/187 415/115 |
| 9,188,014 | B2 * | 11/2015 | Fachat | F01D 5/225 |
| 9,534,500 | B2 | 1/2017 | Bouchard et al. | |
| 9,840,931 | B2 | 12/2017 | Joshi et al. | |
| 10,030,529 | B2 | 7/2018 | Bergman et al. | |
| 10,408,075 | B2 | 9/2019 | Bunker | |
| 10,774,668 | B2 | 9/2020 | Wesling et al. | |
| 10,876,407 | B2 * | 12/2020 | Miller | F01D 5/06 |
| 2007/0297900 | A1 | 12/2007 | Abgrall et al. | |
| 2009/0097980 | A1 | 4/2009 | Hayasaka et al. | |
| 2009/0238683 | A1 | 9/2009 | Alvanos | |
| 2010/0202888 | A1 | 8/2010 | Miller | |
| 2016/0047260 | A1 | 2/2016 | McCaffrey | |
| 2016/0160867 | A1 | 6/2016 | Gehlot | |
| 2016/0305260 | A1 * | 10/2016 | Freeman | F01D 5/284 |
| 2017/0058686 | A1 | 3/2017 | Bancheri et al. | |
| 2017/0159478 | A1 | 6/2017 | Dev et al. | |

FOREIGN PATENT DOCUMENTS

| | | | | |
|---|---|---|---|---|
| DE | 4229769 | A1 * | 3/1994 | F01D 5/22 |
| EP | 2105581 | A2 | 9/2009 | |
| EP | 2832975 | A1 | 2/2015 | |
| GB | 943023 | | 11/1963 | |
| WO | 2004074640 | A1 | 9/2004 | |

* cited by examiner

TURBINE ENGINE WITH INTERLOCKING SEAL

CROSS-REFERENCE TO RELATED APPLICATION(S)

This application is a continuation of U.S. patent application Ser. No. 16/936,567, filed Jul. 23, 2020, which claims priority to Italian Application No. 102019000013854, filed Aug. 2, 2019, which are incorporated herein by reference in their entirety.

The project leading to this application has received funding from the Clean Sky 2 Joint Undertaking under the European Union's Horizon 2020 research and innovation program under grant agreement No. CS2-LPA-GAM-201e 8/2019-01.

TECHNICAL FIELD

This disclosure generally relates to a turbine engine with an outer rotor that circumscribes an inner rotor or inner stator and more specifically relates to the dampening or sealing of adjacent components coupled to the outer rotor.

BACKGROUND

Turbine engines, and particularly gas or combustion turbine engines, are rotary engines that extract energy from a flow of combusted gases passing through the engine onto a multitude of rotating turbine blades.

A turbine engine includes but is not limited to, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies.

In at least some turbine engines, at least one turbine rotates in an opposite direction than the other rotating components within the engine. In some implementations a counter-rotating low-pressure turbine includes an outer drum having a first set of stages that are rotatably coupled to the forward fan assembly, and an inner drum having an equal number of stages that is rotatably coupled to the aft fan assembly.

Counter rotating blades present challenges and a need for better sealing or dampening between the circumferentially arranged rotating portions coupled to the outer rotor. For example, improved sealing or dampening between the inner ends of circumferentially arranged airfoils coupled to the outer rotor.

BRIEF DESCRIPTION

In one aspect, the present disclosure relates to a turbine engine that includes an inner rotor/stator having a longitudinal axis, an outer rotor circumscribing at least a portion of the inner rotor/stator and rotating about the longitudinal axis, and having at least one component comprising a plurality of circumferentially arranged and radially extending component segments, each component segment having first and second ends, and a damper element securing the first and second ends to each other.

DETAILED DESCRIPTION

Figure 1:
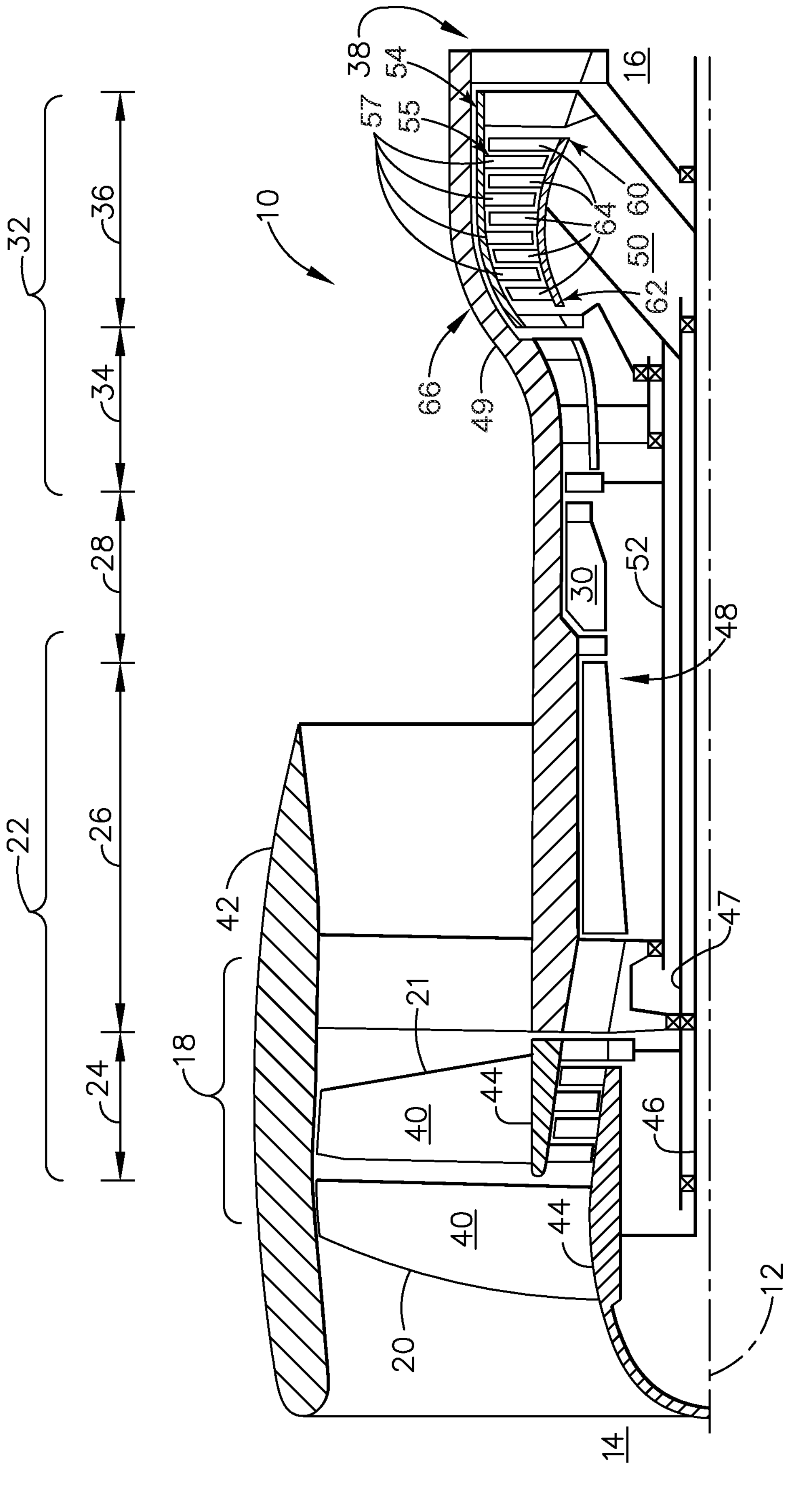
FIG. 1 is a schematic cross-sectional diagram of a turbine engine with a counter rotating low pressure turbine for an aircraft.

Aspects of the disclosure described herein are directed to the sealing or dampening of circumferentially arranged components coupled to an outer rotor, where the outer rotor circumscribes an inner rotor/stator. For purposes of illustration, the present disclosure will be described with respect to a counter rotating low pressure turbine for an aircraft turbine engine. It will be understood, however, that aspects of the disclosure described herein are not so limited and may have general applicability within an engine, including, but not limited to, low pressure turbines with stationary stator components or counter-rotating portions of the engine located in positions other than the low-pressure turbine portion. It will be further understood that aspects of the disclosure described herein are not so limited and may have general applicability in non-aircraft applications, such as other mobile applications and non-mobile industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward means upstream and aft/rearward means downstream. Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The turbine engine 10 has a centerline or longitudinal axis 12 extending forward 14 to aft 16. The turbine engine 10 includes, in downstream serial flow relationship, a fan section 18 including a forward fan assembly 20 and an aft fan assembly 21, a compressor section 22 including a booster or low pressure (LP) compressor 24 and a high pressure (HP) compressor 26, a combustion section 28 including a combustor 30, a turbine section 32 including a HP turbine 34, and a counter-rotating LP turbine 36, and an exhaust section 38.

The fan assemblies 20 and 21 are positioned at a forward end of the turbine engine 10 as illustrated. The terms "forward fan" and "aft fan" are used herein to indicate that one of the fans 20 is coupled axially upstream from the other fan 21. It is also contemplated that the fan assemblies 20, 21 can be positioned at an aft end of turbine engine 10. Fan assemblies 20 and 21 each include a plurality of rows of fan blades 40 positioned within a fan casing 42. The fan blades 40 are joined to respective rotor disks 44 that are rotatably coupled through a respective forward fan shaft 46 to the forward fan assembly 20 and through an aft fan shaft 47 to the aft fan assembly 21.

The HP compressor 26, the combustor 30, and the HP turbine 34 form an engine core 48 of the turbine engine 10. The engine core 48 is surrounded by a shroud or outer casing 49 defining an interior 50, which can be coupled with the fan casing 42. The HP turbine 34 is coupled to the HP compressor 26 via a core rotor or shaft 52. In operation, the engine core 48 generates combustion gases that are channeled downstream to the counter-rotating LP turbine 36 which extracts energy from the gases for powering fan assemblies 20, 21 through their respective fan shafts 46, 47.

The counter-rotating LP turbine 36 includes an outer rotor 54 positioned radially inward from outer casing 49. The outer rotor 54 can have a generally frusto-conical shape. The outer rotor 54 can include at least one component that includes a plurality of circumferentially arranged component segments, illustrated by example as a first set of airfoils 55 comprised of a plurality of circumferentially arranged airfoils 57 that extend radially inwardly from the outer rotor 54 towards the longitudinal axis 12. The first set of airfoils 55 can be a first set of rotating blades comprised of a plurality of circumferentially arranged blades. Alternatively, the first set of airfoils 55 can be circumferentially arranged stationary blades or vanes, where a pair of stationary blades or vanes can form a nozzle.

The counter-rotating LP turbine 36 further includes an inner rotor/stator 60 that is at least in part circumscribed by the outer rotor 54. The inner rotor/stator 60 can be stationary or rotate depending on the particular engine configuration. As illustrated by way of example, the inner rotor/stator 60 is arranged substantially coaxially with respect to, and radially inward of the outer rotor 54. The inner rotor/stator 60 includes a second set of airfoils 62 with airfoils 64, circumferentially arranged, where each airfoil 64 extends radially outwardly away from the longitudinal axis 12. The second set of airfoils 62 can be a first set of rotating blades comprised of a plurality of circumferentially arranged blades. Alternatively, the second set of airfoils 62 can be stationary blades or vanes, where a pair of stationary blades or vanes can form a nozzle.

The first and second sets of airfoils 55, 62 define a plurality of turbine stages 66. While illustrated as having five stages, it should be understood that any quantity of stages is contemplated and the stages shown are for illustrative purposes and not meant to be limiting.

While illustrated as having a counter-rotating LP turbine 36, it should be understood that aspects of the disclosure discussed herein can be applied to turbine engines without counter-rotating LP turbines. Turbine engines having LP turbines in which static circumferentially arranged vanes are axially spaced from rotating circumferentially arranged blades are also contemplated. Furthermore, it is also contemplated that the compressor section 22, in particular either the LP compressor 24 or the HP compressor 26 of the turbine engine 10, can counter-rotate.

Figure 2:
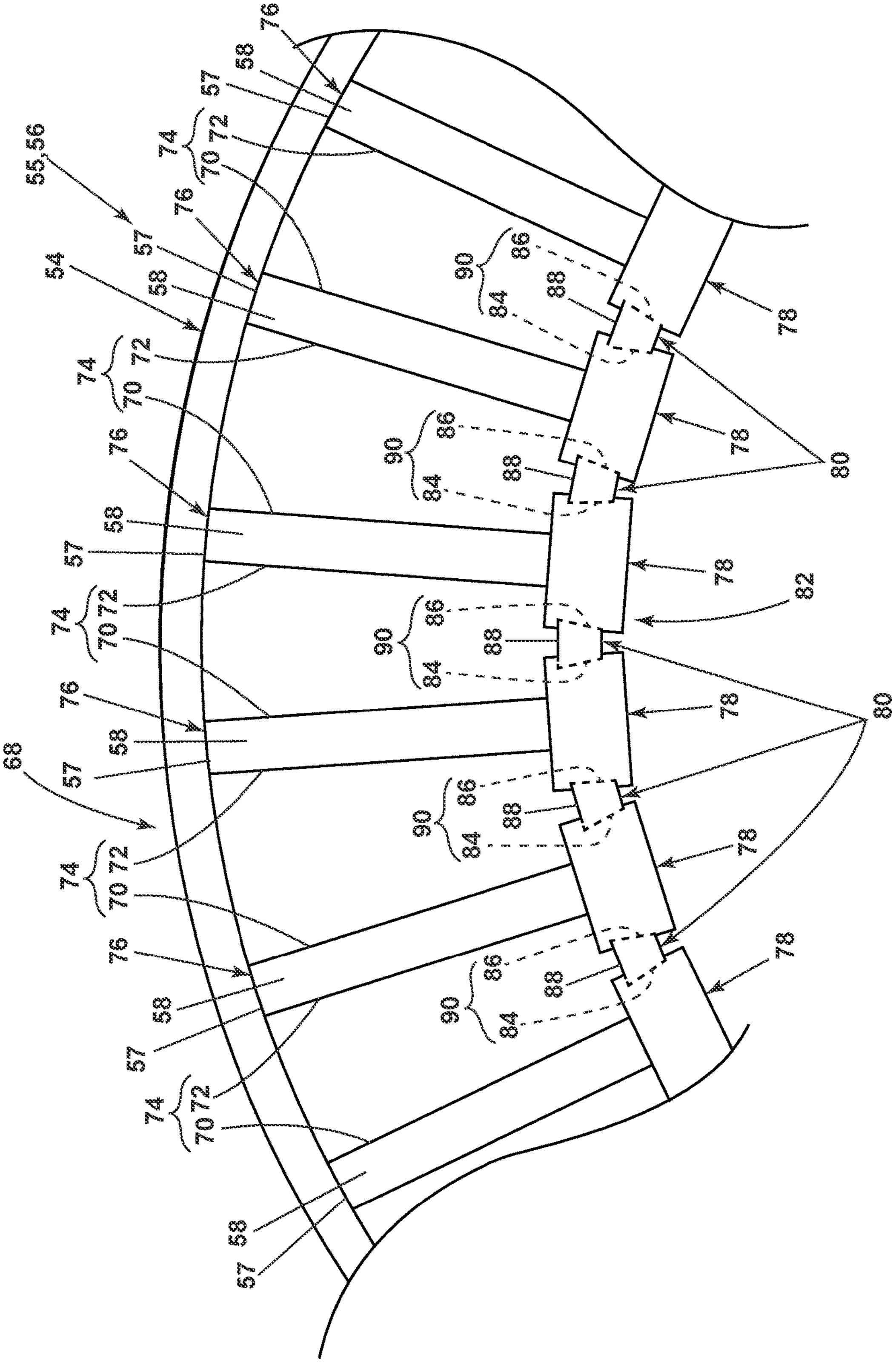
FIG. 2 is an enlarged schematic view of a portion of an outer rotor and blades of the counter rotating low pressure turbine of FIG. 1.

FIG. 2 is an enlarged schematic view of a portion of the outer rotor 54 and the first set of airfoils 55, where the first set of airfoils are illustrated, by way of example, as the first set of blades 56. The outer rotor 54 can form an outer band 68 from which the first set of blades 56 extend. Each of the airfoils 57 or blades 58 of the first set of blades 56 has a first circumferential end 70 and a second circumferential end 72, where the first and second circumferential ends 70, 72 of adjacent blades 58 form confronting pairs 74 of first and second circumferential ends 70, 72. An outer end 76 of each of the blades 58 is radially spaced from an inner end 78, where the outer end 76 can be coupled to the outer band 68.

A radial damper element 80 can secure the inner ends 78 of at least the adjacent blades 58 or confronting pairs 74. An inner band 82 can be formed from the connecting of the inner ends 78 of the confronting pairs 74 the damper element 80. The damper element 80 can include a first channel 84 on the first circumferential end 70, a second channel 86 on the second circumferential end 72, and an interlocking seal or a seal 88. The seal 88 can reside in both the first and second channels 84, 86. A confronting channel pair 90 can be defined by first and second channels 84, 86 that are generally aligned and confronting.

Figure 3:
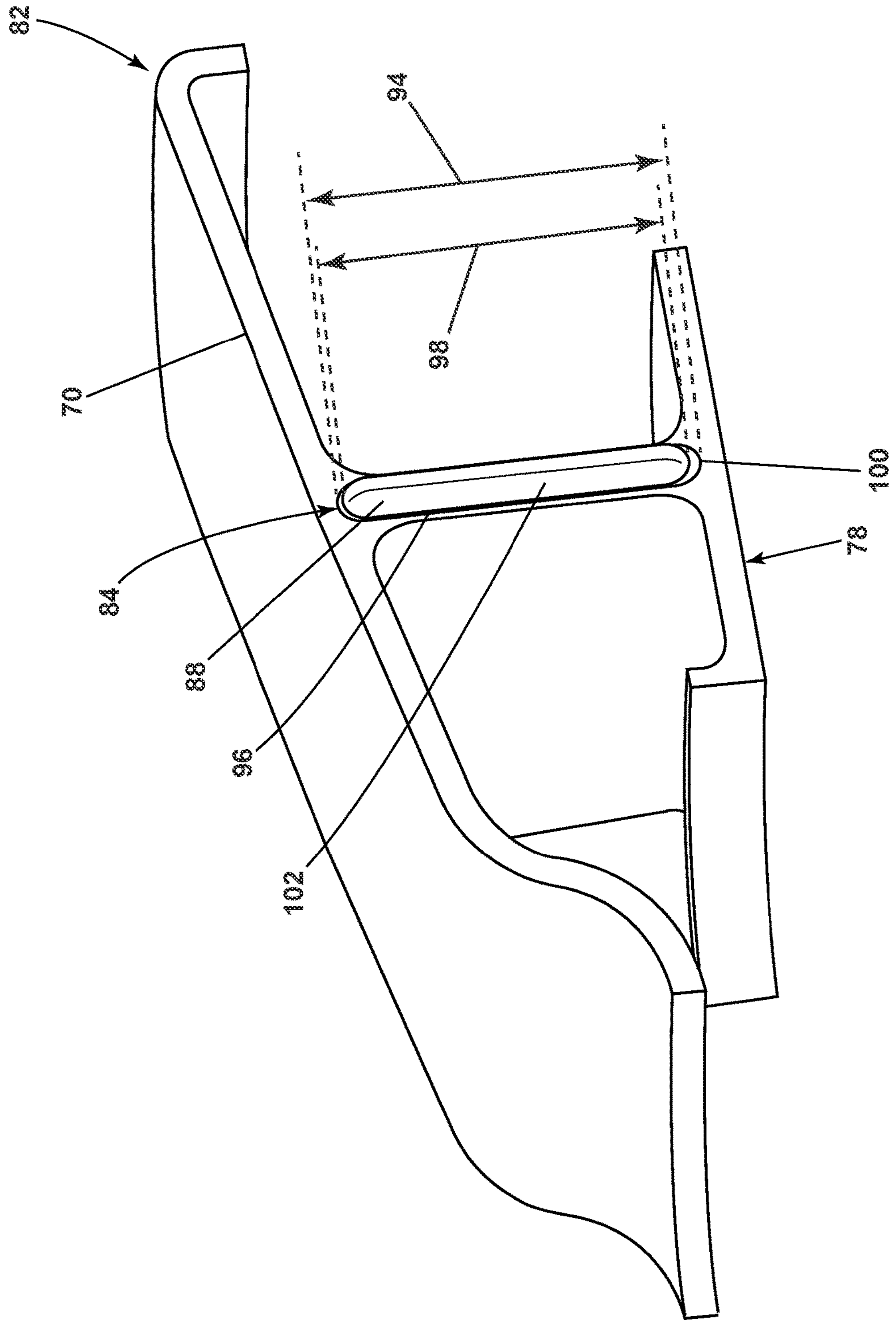
FIG. 3 is a cross section of an inner band from the blades of FIG. 2 taken at a seal.

FIG. 3 is a cross section of the inner band 82, with the blade 58 removed for clarity, taken at the seal 88, illustrated, by way of non-limiting example as the first channel 84 in the first circumferential end 70. The first channel 84 is a circumferential recess that extends in a radial direction, having a radial channel length 94. A channel opening 96 can be defined in the plane of the first circumferential end 70, where the channel opening 96 is generally shaped as a stadium or obround.

The first channel 84 receives at least a portion of the seal 88 having a radial seal length of 98. The radial seal length of 98 is less than the radial channel length 94, defining a gap 100.

A protruding portion 102 of the seal 88 can be received by the second channel 86 (not shown). It is contemplated that the second channel 86 in the second circumferential end 72 would be similar to the first channel 84, so that the confronting channel pair 90 would extend in the radial direction.

In operation, the damper element 80 can secure the inner ends 78 of at least the adjacent blades 58 extending from the outer rotor 54. The damper element 80 secures the inner ends 78 using the seal 88 seated in each confronting channel pair 90 of the confronting pairs 74. The damper element 80 dampens the relative movement of the blades 58 whose inner ends 78 are connected or secured with the seal 88. The relative movement can include, but is not limited to relative radial movement, relative tangential movement, or relative axial movement. The damper element 80 can also be used to direct, prevent, or control airflow, for example, between the blades 58. It is contemplated that the damping element 80 or the seal 88 can dissipate kinetic energy from the inner ends 78 of the blades 58. It is further contemplated, by way of non-limiting example, that the seal 88, at least in part, can include nickel, cobalt base alloys, ceramic material, or any combination therein.

Figure 4:
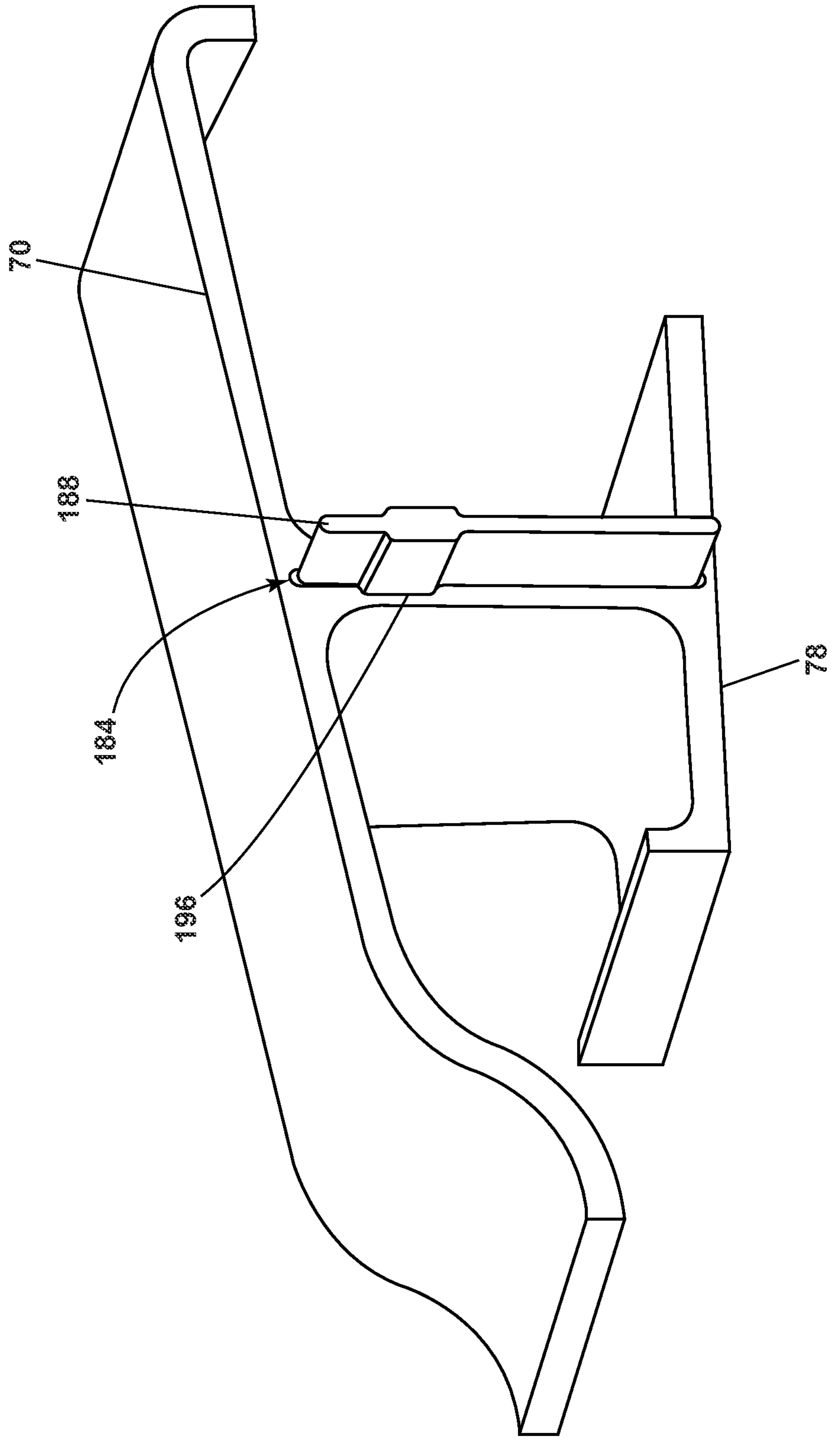
FIG. 4 is another cross section of the inner band from the blades of FIG. 2 taken at the seal.

FIG. 4 is another example of a cross section of the inner band 82 taken at a seal 188. The seal 188 is similar to the seal 88, therefore, like parts will be identified with like numerals increased by 100, with it being understood that the description of the like parts of the seal 88 applies to the seal 188, unless otherwise noted. The seal 188 is received by a first channel 184 in the first circumferential end 70. A channel opening 196 can have a similar shape to a cross or rectangular cross section of the first channel 184.

Figure 5:
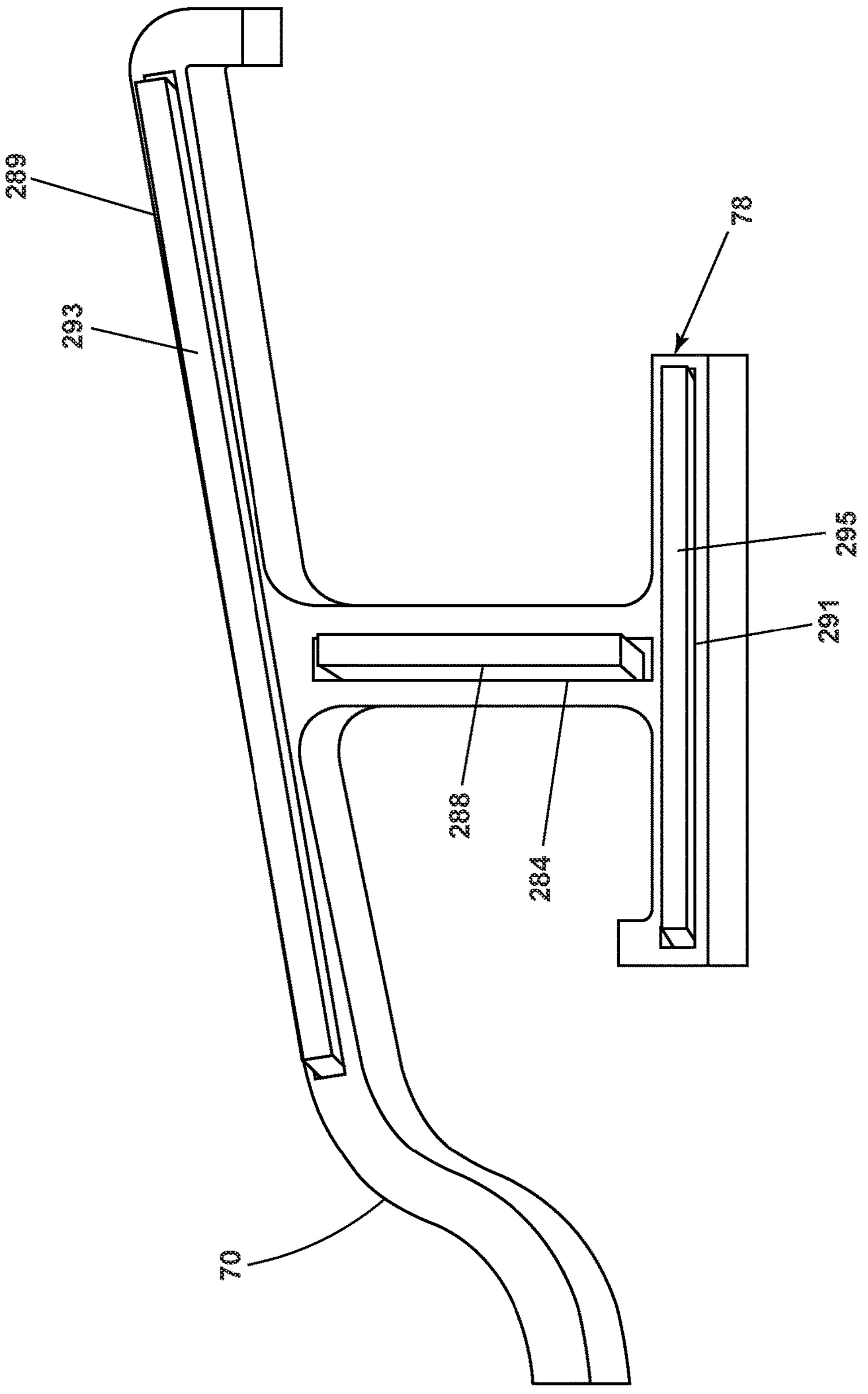
FIG. 5 is yet another cross section of the inner band from the blades of FIG. 2 taken at the seal.

FIG. 5 is yet another example of a cross section of the inner band 82 taken at a seal 288. The seal 288 is similar to the seal 88, therefore, like parts will be identified with like numerals increased by 200, with it being understood that the description of the like parts of the seal 88 applies to the seal 288, unless otherwise noted. An upper channel 289 or a lower channel 291 can be formed in the first circumferential end 70. The upper channel 289 can receive an upper seal 293, while the lower channel 291 can receive a lower seal 295. It is contemplated that complementing upper or lower channels are located in the second circumferential end 72 (not shown) that can receive the upper or lower seals 293, 295, respectively. The upper or lower seals 293, 295 can be used in addition to the seal 288 received by a first channel 284. It is contemplated that any number of seals can reside in the inner band 82 to secure the inner ends 78.

It is contemplated that the seal(s) 88, 188, 288, 293, 295 residing in the first and second channels 84, 86, 184, upper channels 289, or lower channels 291 can have any shape. It is further contemplated that more than one seal can reside in the confronting channel pairs 90.

It is contemplated that the first channel 84, 184, 284 can be have different shapes or dimensions than the second channel 86 and still be aligned and confronting.

Figure 6:
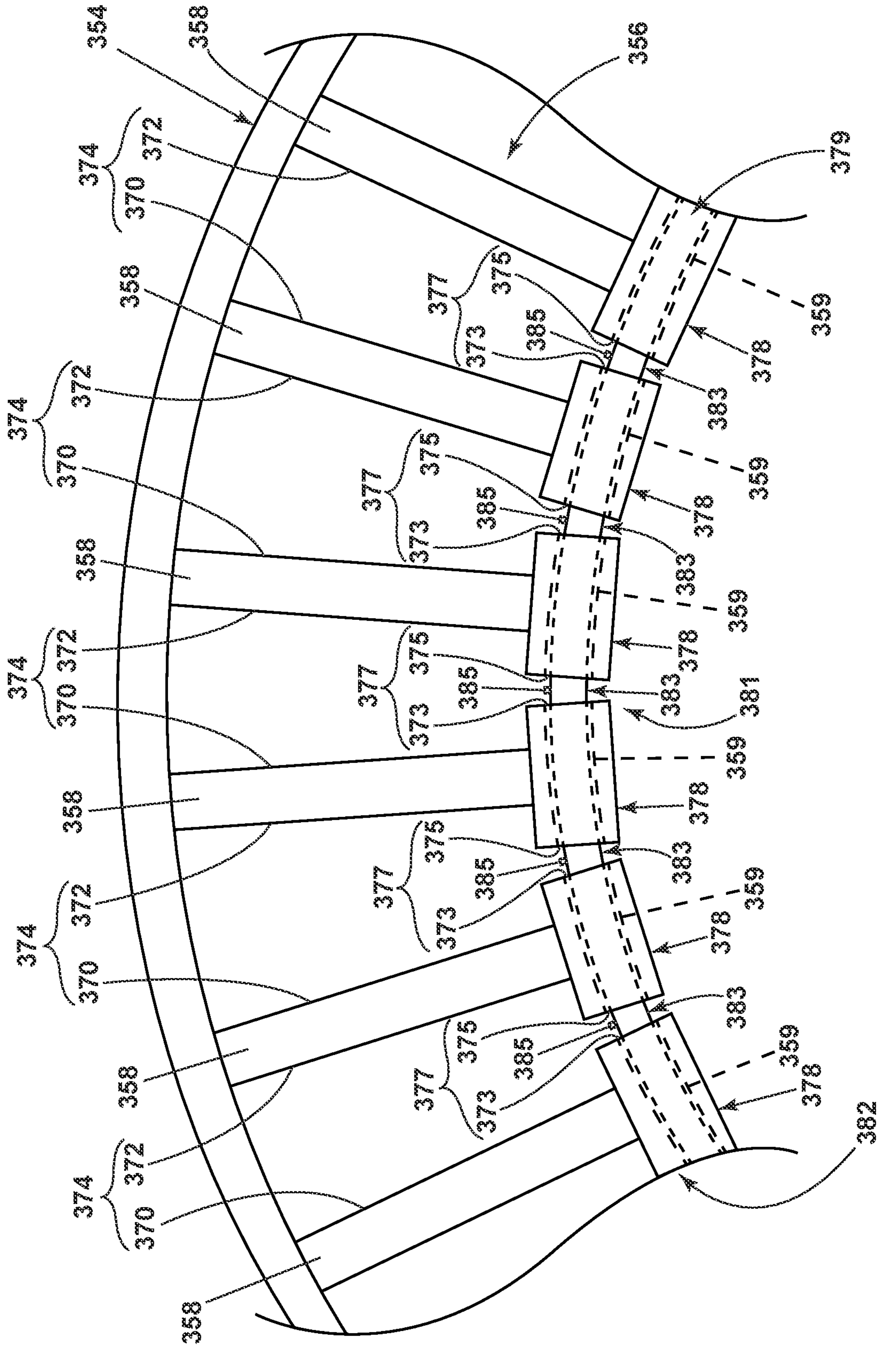
FIG. 6 is another enlarged schematic view of a portion of an outer rotor and blades of the counter rotating low pressure turbine of FIG. 1.

FIG. 6 is another enlarged schematic view of a portion of an outer rotor 354 and a first set of blades 356. The outer rotor 354 and the first set of blades 356 is similar to the outer rotor 54 and the first set of blades 56, therefore, like parts will be identified with like numerals increased by 300, with it being understood that the description of the like parts of the outer rotor 54 and the first set of blades 56 applies to the outer rotor 354 and the first set of blades 356, unless otherwise noted.

Each of the plurality of circumferential blades 358 of the first set of blades 356 includes a passage segment 359. The passage segment 359 extends between and opens onto a first circumferential end 370 and a second circumferential end 372. The passage segment 359 can be located in an inner band 382 used to secure an inner end 378 of each of the plurality of circumferential blades 358.

A first opening 373 can be defined by the passage segment 359 opening at the first circumferential end 370. A second opening 375 can be defined by the passage segment 359 opening at the second circumferential end 372. A confronting open pair 377 is defined by the first and second openings 373, 375 of adjacent blades 358.

A radial damper element 381 can include a tube 383 that extends between the first and second opening 373, 375 of the confronting open pair 377. The tube 383 can extend only partially into the passage segments 359 the confronting open pair 377. Alternatively, the tube 383 can extend through a circumferential passage 379 formed from the collection of the passage segments 359 in the first set of blades 356. The circumferential passage 379 can circumscribe the inner band 382. It is contemplated that the tube 383 can be any number of pieces of tubing, including one. It is further contemplated that the tube 383 can be any length including, but no limited to, the length of the circumferential passage 379.

The tube 383 includes a spacer 385 located between confronting pairs 374 of first and second confronting ends. That is, the spacer 385 is located between or is used to maintain separation of the inner ends 378 the first and second confronting ends 370, 372. While illustrated as a ridge 391 or detent, the spacer 385 can have any shape and circumscribe a portion of the tube 383. Alternatively, the spacer 385 can circumscribe the entire circumference of the tube 383, illustrated by circumferential spacer 395. The spacer 385 can be used to help located the tube 383 with respect to the adjacent blades 358. Additionally, or alternatively, the spacer 385 can provide a barrier to maintain a minimum distance between the first and second confronting ends 370, 372.

Figure 7:
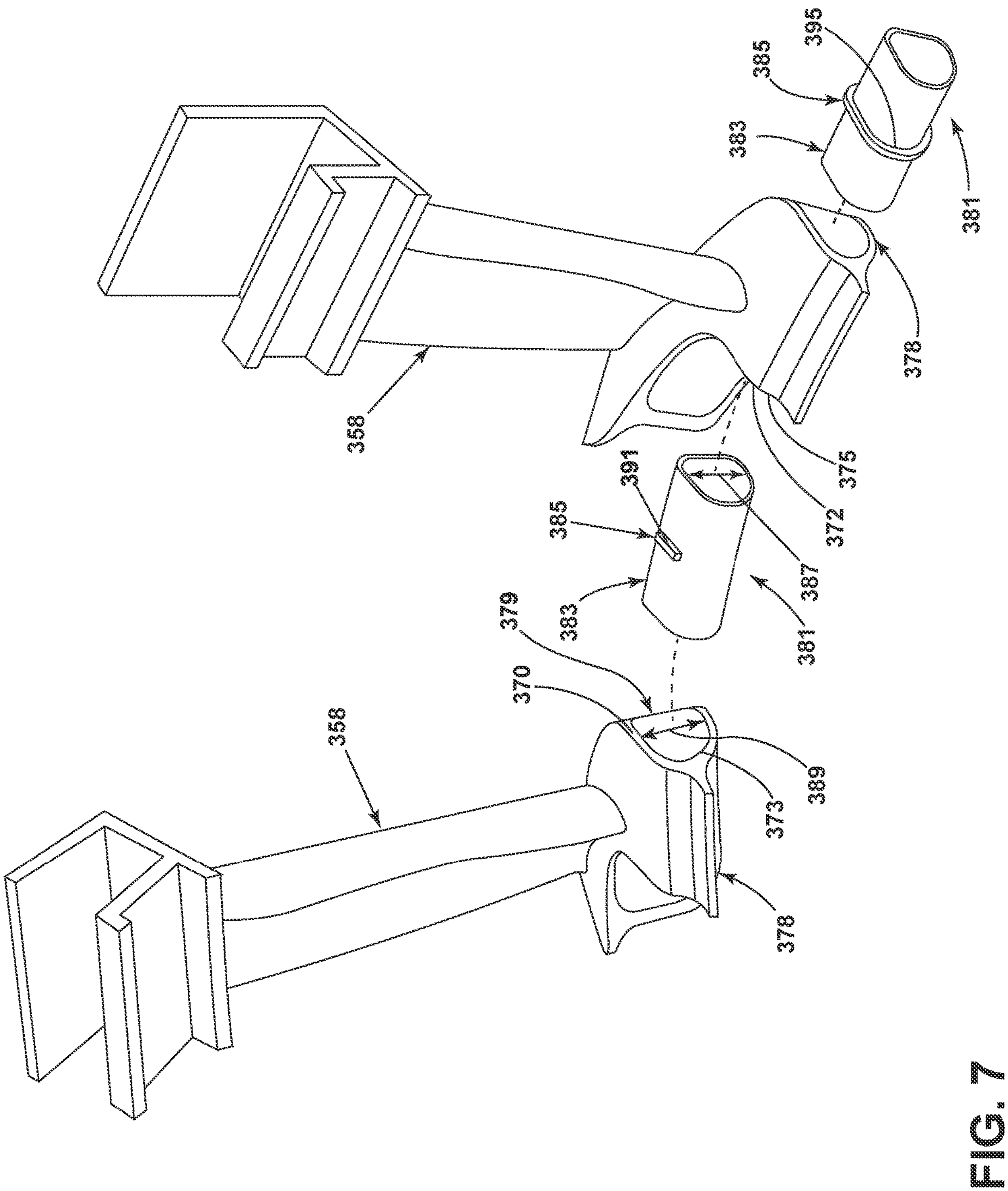
FIG. 7 is an exploded view of a damper element and the adjacent blades from FIG. 6.

FIG. 7 is an exploded view of adjacent blades 358 with the damper element 381. A tube cross-section profile 387 can be obtained from the largest dimension of the cross section of the tube 383. A passage cross-section profile 389 can be obtained from the largest dimension of the cross section of the passage segment 359. The damper element 381 dampens the relative movement of the blades 358 whose inner ends 378 are connected or secured with the tube 383. The relative movement can include, but is not limited to relative radial movement, relative tangential movement, or relative axial movement. The damper element 381 can also be used to direct, prevent, or control airflow, for example, between the blades 358. It is contemplated that the damping element 381 or the tube 383 can dissipate kinetic energy from the inner ends 378 of the blades 358. It is further contemplated, by way of non-limiting example, that the tube 383 can, at least in part, include nickel, cobalt base alloys, ceramic material, or any combination therein.

Figure 8:
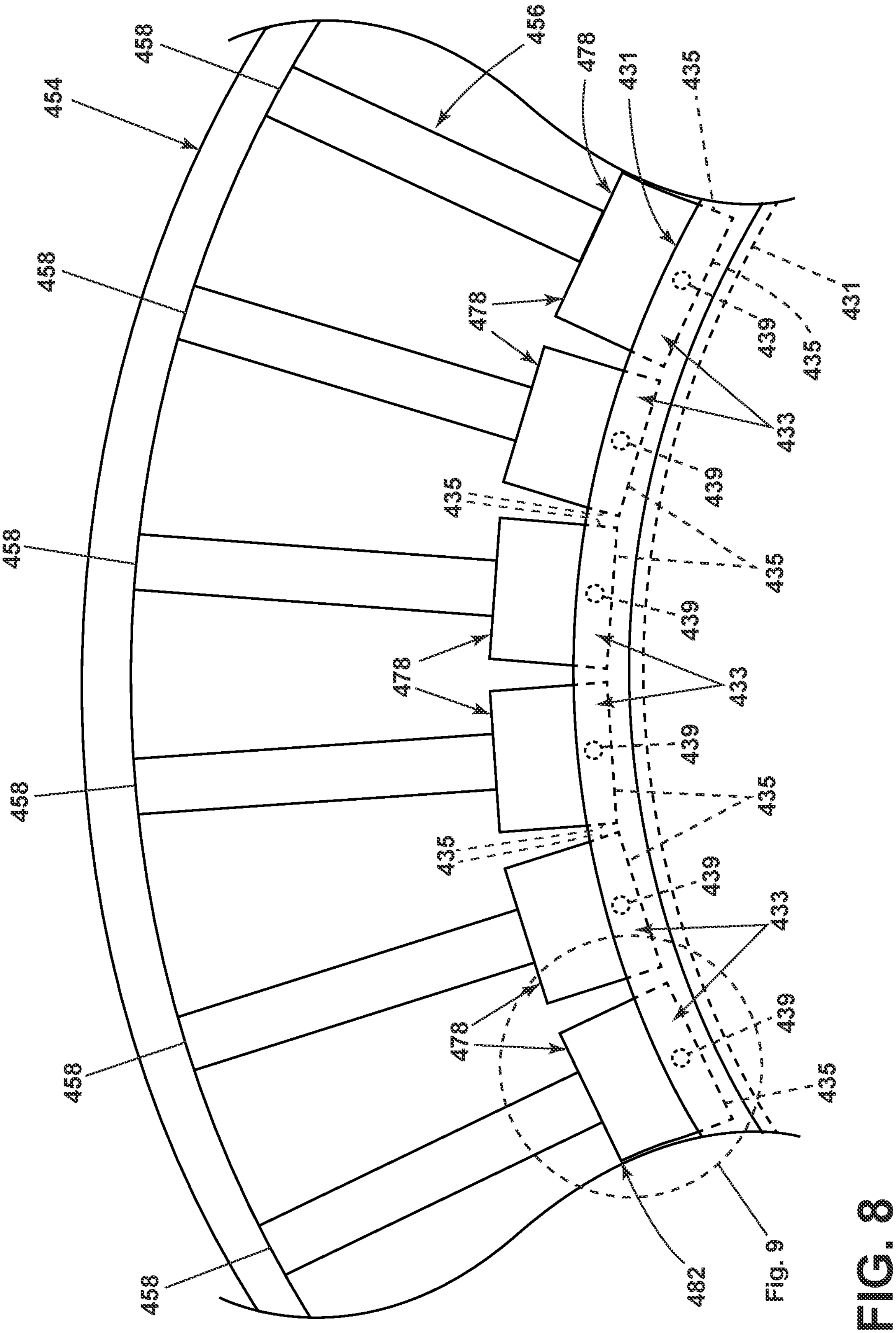
FIG. 8 is yet another enlarged schematic view of a portion of an outer rotor and blades of the counter rotating low pressure turbine of FIG. 1.

FIG. 8 is yet another enlarged schematic view of a portion of an outer rotor 454 and a first set of blades 456. The outer rotor 454 and the first set of blades 456 is similar to the outer rotor 54 and the first set of blades 56, therefore, like parts will be identified with like numerals increased by 400, with it being understood that the description of the like parts of the outer rotor 54 and the first set of blades 56 applies to the outer rotor 454 and the first set of blades 456, unless otherwise noted.

A radial damper element 431 couples inner ends 478 of circumferentially adjacent inner ends 478 of the blades 458. The damper element 431 can include a bracket 433 that can be attached to or formed with the blade 458. The bracket 433 can include a radially extending flange 435 that couples to a ring 437. The ring 437 secures the inner ends 478 of the first set of blades 456. An inner band can be defined by the inner ends 478 with the radially extending flanges 435 to which the ring 437 mounts.

As illustrated, by way of non-limiting example, the ring 437 can circumscribe an inner band 482. Alternatively, the ring 437 can include one or more regions that can expand, contract, or provide a gap for expansion or contraction.

A fastener 439 can couple the radially extended flange 435 to the bracket 433. The fastener 439 can be a bolt, pin, screw, nail, clip, hook, or any other known fastening device or combination thereof. Alternatively, the radially extended flange 435 can be attached to the blade 458 using known adhesive or bonding methods or materials, such as, but not limited to, welding, melting, pressure fitting, or unitary formation. Optionally, a honeycomb wear pad 447 can be mounted to the radially extending flange 435 or the ring 437.

Figure 9:
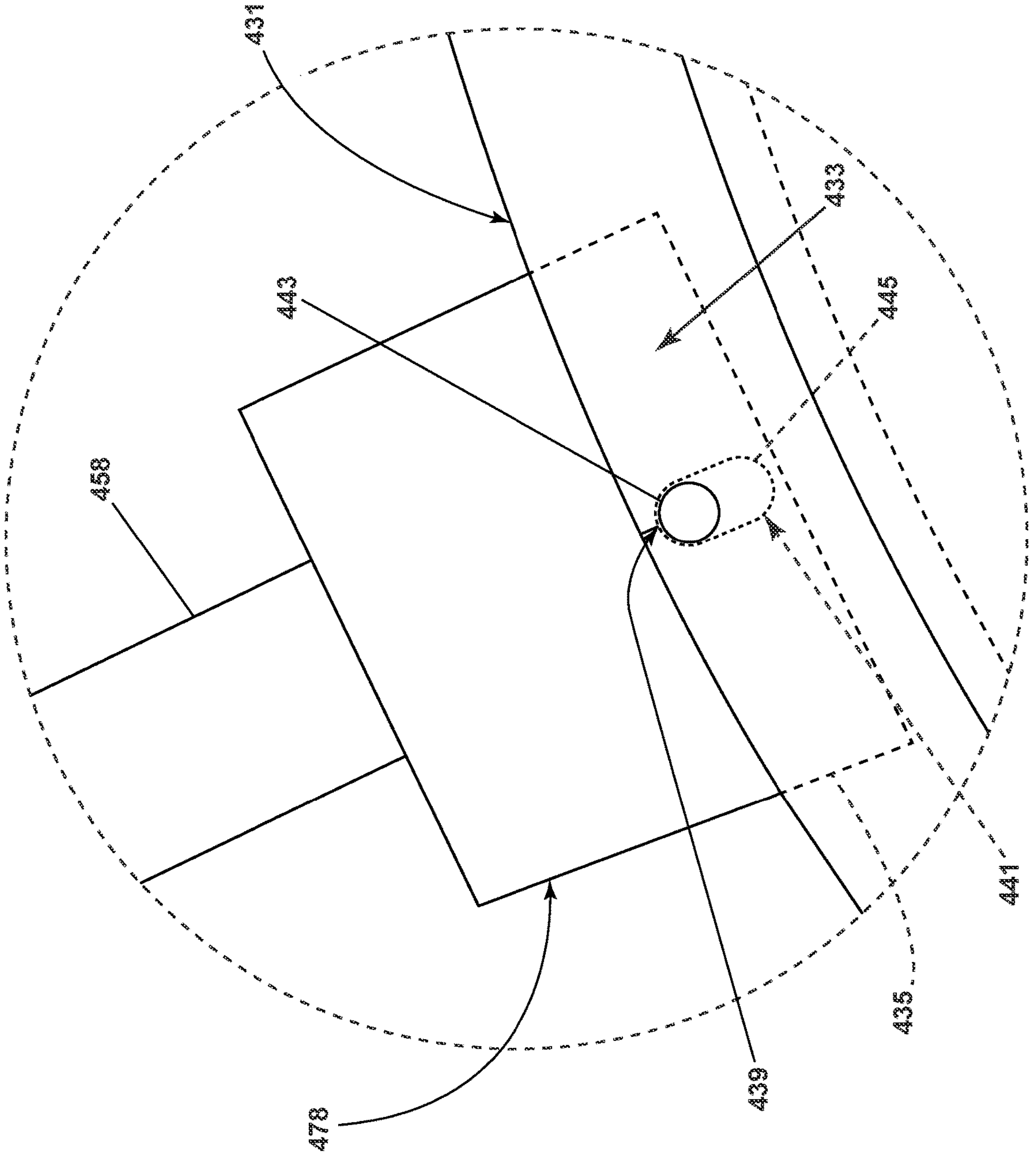
FIG. 9 is an enlarged schematic view of a portion the blades of FIG. 8.

FIG. 9 is an enlarged schematic view of a portion of the blade 458 further illustrating the bracket 433 with radially extending flange 435. An aperture 441 or pass in the bracket 433 or inner end 478 can receive the fastener 439. The fastener 439 can have a fastener cross-sectional shape 443, illustrated by way of non-limiting example as a circle. The aperture 441 can have an aperture cross-sectional shape 445, illustrated by way of non-limiting example as ovate. It is contemplated that the fastener cross-sectional shape 443 and the aperture cross-sectional shape 445 can have similar or different cross-sectional shapes. It is further contemplated that the aperture 441 can be oversized relative to the fastener 439.

Figure 10:
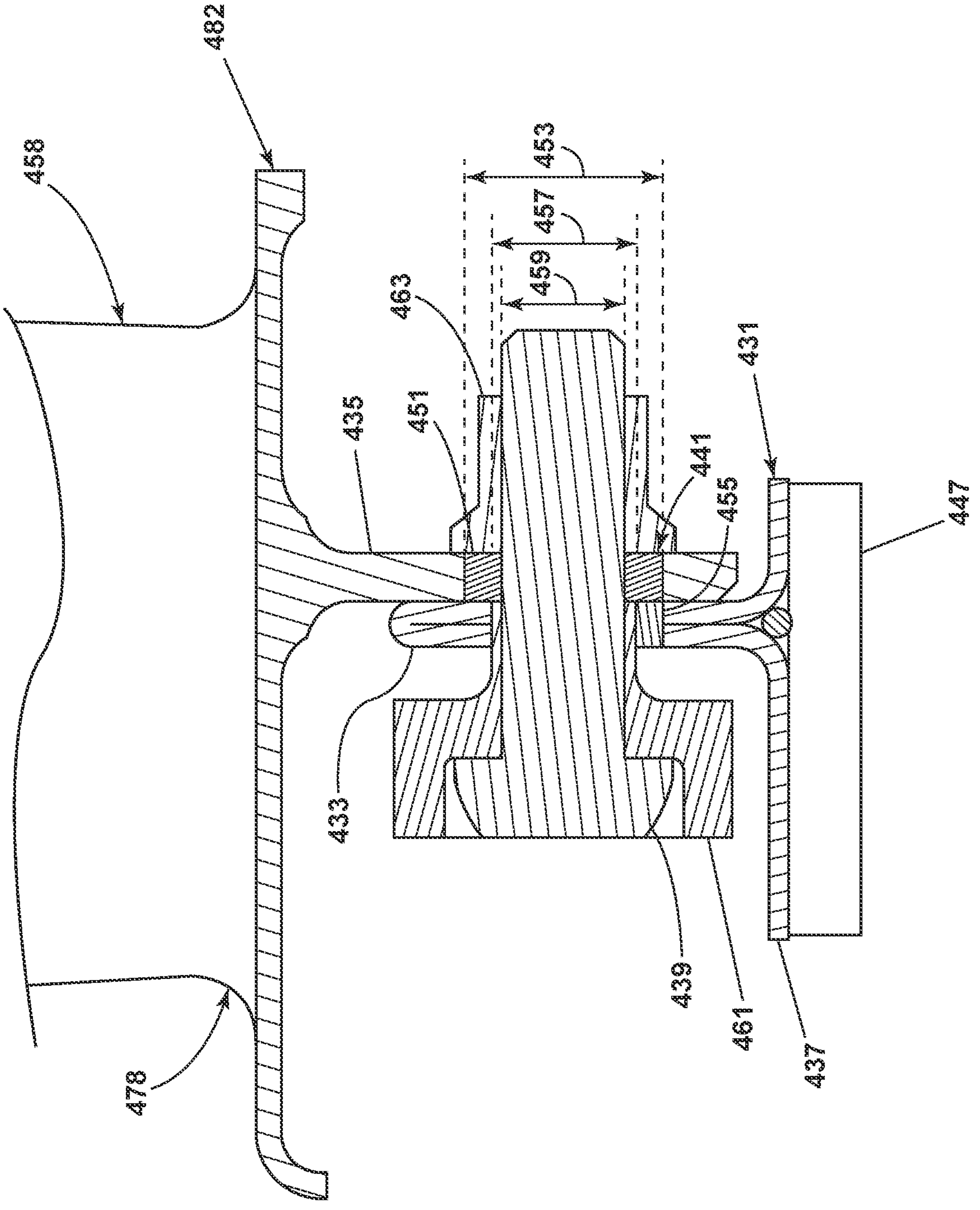
FIG. 10 is a cross section of an inner band from the blades of FIG. 8, taken at a fastener.

FIG. 10 is a cross section of the inner band 482 taken at the fastener 439. The fastener 439 can pass through the aperture 441 to secure the damper element 431 to the inner end 478 of the blade 458. By way of non-limiting example, the aperture 441 is illustrated as a bracket pass 455 and a flange pass 451. The flange pass 451 passes through the radially extending flange 435 and can have a flange pass diameter 453 taken at the largest radial dimension of the flange pass 451. The bracket pass 455 passes through the bracket 433 of the damper element 431 and has a bracket pass diameter 457 taken at the radial largest dimension of the bracket pass 455. The flange pass 451, the bracket pass 455, or the aperture 441 can be oversized compared to a fastener diameter 459 taken at the largest radial dimension of the flange pass 451. Oversized can be, for example, more than 2% larger than the fastener diameter 459. Optionally, the fastener 439 can pass through a guide 461 that can extend into the bracket 433 or the radially extending flange 435. A securing element 463 can be used to further adjust the position of the fastener 439 within the flange pass 451, bracket pass 455, or guide 461.

The honeycomb wear pad 447 can mount to the radially extending flange 435 via the ring 437 of the damper element 431. The honeycomb wear pad 447 an be secured to the ring 437 using any known fastening, molding, or adhering technique.

It should be understood that any combination of the geometry related to the orientation of aspects disclosure herein is contemplated. The varying aspects of the disclosure discussed herein are for illustrative purposes and not meant to be limiting.

The damper element 431 dampens the relative movement of the blades 458 whose inner ends 478 are connected or secured by the ring 437. The relative movement can include, but is not limited to relative radial movement, relative tangential movement, or relative axial movement. The damper element 431 can also be used to direct, prevent, or control airflow, for example, between the blades 458. It is contemplated that the damping element 431 or the ring 437 can dissipate kinetic energy from the inner ends 478 of the blades 458.

While cooling as discussed herein is optimal for a counter rotating turbine, it can also be implemented in other types of turbine engines, such as, but not limited to, turbine engines with fan and booster sections, turbojets, or turbo engines.

Benefits associated with aspects of the disclosure herein include reduction of leakage of airflow between adjacent airfoils. That is, the orientation and application of the set of interlocking seals described and illustrated herein control the flow of cooling fluid and help with windage reduction in, for example, the LP turbine. The relative temperature in the annular cavity with respect to the rotor is also reduced.

Another benefit of one or more portions of the damping element is the dissipation of at least a portion of the kinetic energy of the airfoils. The damping element can also serve as an interlock feature to secure the inner ends of the airfoils. Further, the damping element can limit at least the relative axial movement between adjacent airfoils.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A turbine engine comprising an inner rotor/stator having a longitudinal axis, an outer rotor circumscribing at least a portion of the inner rotor/stator and rotating about the longitudinal axis, and having at least one component comprising a plurality of circumferentially arranged and radially extending component segments, each component segment having first and second ends, and a damper element securing the first and second to each other.

The turbine engine of any preceding clause wherein the damper element comprises a first channel on the first circumferential end of the confronting pair, and a second channel on the second circumferential end of the confronting pair, with the first channel aligned with and confronting the second channel to define a confronting channel pair, and a seal residing in both the first and second channels.

The turbine engine of any preceding clause wherein the confronting channel pair extend in a radial direction.

The turbine engine of any preceding clause wherein the length of the seal is less than the length of the confronting channel pair.

The turbine engine of any preceding clause wherein the seal has at least one of a cross or rectangular cross section.

The turbine engine of any preceding clause wherein the component segments include passage segments extending between and opening onto the first and second circumferential ends at first and second openings to define a confronting open pair of the first and second openings.

The turbine engine of any preceding clause wherein the passage segments collectively form a circumferential passage.

The turbine engine of any preceding clause wherein the damper element comprises a tube extending through the confronting open pair of the first and second openings.

The turbine engine of any preceding clause wherein the tube extends only partially into passage segments of the pair of confronting ends.

The turbine engine of any preceding clause wherein the tube comprises a spacer located between the confronting pairs of first and second circumferential ends.

The turbine engine of any preceding clause wherein the spacer circumscribes the tube.

The turbine engine of any preceding clause wherein the tube has a cross-sectional profile smaller than the passage segments.

The turbine engine of any preceding clause wherein the damper element comprises a bracket coupling the inner ends of circumferentially adjacent inner ends.

The turbine engine of any preceding clause further comprising an aperture on at least one of the bracket and the inner ends, a fastener extending through the aperture, with the aperture being oversized relative to the fastener.

The turbine engine of any preceding clause wherein the fastener has a fastener cross-sectional shape, the aperture has an aperture cross-sectional shape, which is different than the fastener cross-sectional shape.

The turbine engine of any preceding clause wherein the fastener cross-sectional shape is circular and the aperture cross-sectional shape is ovate.

The turbine engine of any preceding clause wherein the bracket comprises a ring.

The turbine engine of any preceding clause wherein the inner ends define an inner band, with a radially extending flange and the ring mounts to the radially extending flange.

The turbine engine of any preceding clause further comprising a honeycomb wear pad mounted to the radially extending flange.

The turbine engine of any preceding clause wherein the component comprises at least one of a shroud and airfoil.

What is claimed is:

1. A turbine engine comprising:

an inner rotor defining and rotating about an axially extending longitudinal axis;

an outer rotor circumscribing at least a portion of the inner rotor and rotating about the longitudinal axis, wherein the outer rotor rotates about the inner rotor;

at least one component coupled to and rotating with the outer rotor or the inner rotor, the at least one component comprising a plurality of circumferentially arranged and radially extending component segments, wherein each of the component segments includes a passage segment located at an inner band and extending between and opening onto a first circumferential end to define a first opening and a second circumferential end to define a second opening; and a damper element comprising a tube extending at least partially into the passage segments of a confronting open pair defined by the first opening and the second opening of adjacent component segments, wherein the damper element includes a spacer located between the adjacent component segments.

2. The turbine engine of claim 1, wherein the spacer circumscribes the tube.

3. The turbine engine of claim 1, wherein the spacer is a ridge.

4. The turbine engine of claim 1, wherein the spacer is configured to locate the tube with respect to the adjacent component segments.

5. The turbine engine of claim 1, wherein the tube has a cross-sectional profile smaller than the passage segment.

6. The turbine engine of claim 1, wherein the passage segments collectively form a circumferential passage.

7. The turbine engine of claim 6, wherein the tube extends through the circumferential passage.

8. The turbine engine of claim 1, wherein the tube is a plurality of pieces of tubing.

9. The turbine engine of claim 1, wherein the damper element dampens relative radial movement, relative tangential movement, or relative axial movement of the adjacent component segments.

10. The turbine engine of claim 1, wherein the damper element, at least in part, includes nickel, cobalt base alloys, or ceramic material.

11. A turbine engine comprising:

a rotor;

a component coupled to the rotor, the component having a plurality of component segments circumferentially arranged and radially extending from the rotor, each of the plurality of component segments having a passage segment located at an inner band and extending between and opening onto a first circumferential end to define a first opening and a second circumferential end to define a second opening, wherein a confronting open pair is defined by the first opening and the second opening of adjacent component segments of the plurality of component segments; and a damper element that extends between the confronting open pair, wherein the damper element comprises a tube having a spacer located between the confronting open pair.

12. The turbine engine of claim 11, wherein the spacer circumscribes the damper element.

13. The turbine engine of claim 11, wherein the spacer is a ridge.

14. The turbine engine of claim 11, wherein the spacer is configured to locate the damper element with respect to the adjacent component segments.

15. The turbine engine of claim 11, wherein the passage segments collectively form a circumferential passage and the damper element extends through the circumferential passage.

16. The turbine engine of claim 11, wherein the tube is a plurality of pieces of tubing.

17. The turbine engine of claim 11, wherein the plurality of component segments is a plurality of blades.

18. The turbine engine of claim 11, wherein the damper element dampens relative radial movement, relative tangential movement, or relative axial movement of the adjacent component segments.

19. A turbine engine comprising:

a rotor;

a component coupled to the rotor, the component having a plurality of component segments circumferentially arranged and radially extending from the rotor, each of the plurality of component segments having a passage segment extending between and opening onto a first circumferential end to define a first opening and a second circumferential end to define a second opening, wherein a confronting open pair is defined by the first opening and the second opening of adjacent component segments of the plurality of component segments; and a damper element that extends between the confronting open pair, wherein the damper element comprises a tube having a spacer located between the adjacent component segments, wherein the passage segments collectively form a circumferential passage and the damper element extends through the circumferential passage.

20. The turbine engine of claim 19, wherein the tube is a plurality of pieces of tubing.

* * * * *